(12) United States Patent
Lecuivre

(10) Patent No.: US 12,436,863 B2
(45) Date of Patent: Oct. 7, 2025

(54) POWER CAPACITY PLANNING FOR A COMPUTING SYSTEM

(71) Applicant: Eaton Intelligent Power Limited, Dublin (IE)

(72) Inventor: Jerome Lecuivre, Gières (FR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 42 days.

(21) Appl. No.: 18/256,106

(22) PCT Filed: Nov. 30, 2021

(86) PCT No.: PCT/EP2021/083644
§ 371 (c)(1),
(2) Date: Jun. 6, 2023

(87) PCT Pub. No.: WO2022/122486
PCT Pub. Date: Jun. 16, 2022

(65) Prior Publication Data
US 2024/0037008 A1 Feb. 1, 2024

(30) Foreign Application Priority Data
Dec. 10, 2020 (GB) .................................... 2019470

(51) Int. Cl.
*G06F 11/34* (2006.01)
*G06F 1/28* (2006.01)
(Continued)

(52) U.S. Cl.
CPC ...... *G06F 11/3442* (2013.01); *G06F 11/3419* (2013.01); *G06F 11/3433* (2013.01)

(58) Field of Classification Search
CPC ............. G06F 11/3442; G06F 11/3419; G06F 11/3433
See application file for complete search history.

(56) References Cited

U.S. PATENT DOCUMENTS 8,397,088 B1 * 3/2013 Ghose .................. A61K 36/185
713/300
8,959,006 B2 * 2/2015 Nasle ...................... H04L 67/01
703/2

(Continued)

FOREIGN PATENT DOCUMENTS

JP          2011160596 A        8/2011

*Primary Examiner* — Jaweed A Abbaszadeh
*Assistant Examiner* — Gayathri Sampath
(74) *Attorney, Agent, or Firm* — LEYDIG, VOIT & MAYER, LTD.

(57) ABSTRACT

A computer-implemented method for power capacity planning for a computing system the following steps: a) evaluating an activity of the computing system, wherein the activity comprises the number of program instances executed by the computing system; b) predicting an evolution of the activity based on the evaluated activity by using a first machine learning algorithm configured for activity evolution prediction; c) predicting a power consumption of the computing system as a first power metric; d) predicting an autonomy of one or more uninterruptible power supplies of the computing system as a second power metric; e) predicting a redundancy level of the computing system as a third power metric; and, f) generating output data related to power capacity planning by processing the first, second and third power metrics.

12 Claims, 4 Drawing Sheets

(51) Int. Cl.
*G06F 9/455* (2018.01)
*G06F 9/50* (2006.01)
*G06F 11/30* (2006.01)
*G06N 20/20* (2019.01)

(56) References Cited

U.S. PATENT DOCUMENTS

2011/0202467 A1* 8/2011 Hilber ................... H02J 3/14
  700/296
2012/0053925 A1* 3/2012 Geffin .................. H05K 7/1498
  703/21

* cited by examiner

POWER CAPACITY PLANNING FOR A COMPUTING SYSTEM

TECHNICAL FIELD

This specification relates to power capacity planning of power devices such as UPSs or ePDUs for a computing system, which may be employed in a datacenter, and the specification particularly relates to predicting power metrics and to compute an evolution of the predicted power metrics based on one or more user defined scenarios for power capacity planning of the computing system.

BACKGROUND

A typical datacenter comprises a building or a group of buildings with one or more rooms. Each room in such a datacenter typically contains one or more rows, in which one or more racks can be arranged, which contain IT (Information Technology) system equipment such as physical servers (PSs) or server computers. The IT system equipment is usually powered by power equipment comprising power devices like (but not limited to) electronic Power Distribution Units (ePDUs) or Uninterruptible Power Supplies (UPSs) or a combination of them.

An example of a computing system is a virtual system comprising several virtual machines (VMs) hosted by two or more PSs. Such a virtual system may be for example applied in a datacenter with PSs hosting the VMs. Typically, each PS hosts one hypervisor. Each hypervisor hosts one or several VMs Power capacity planning for a computing system applied in a datacenter such as the before mentioned virtual system is commonly based on a fixed derating value of the maximum power consumption of PSs of the computing system. For example, in case of 10 PSs each comprising two power supply units of 500 watts max each. 60% of derating results in a derating value of 6000 watts power consumption.

When the software VMware vRealize Operation Manager 7 from VMware, Inc. is used in planning a virtual system, computer and storage metrics may be considered for capacity planning, which however results in a compute only and storage only capacity planning.

GB1919009.9 relates to power management of a computing system, which may be employed in a datacenter, and particularly relates to managing actions on the computing system particularly to be performed in reaction to power events or in reaction to grid instability particularly through a "demand response" mechanism. The power management described in GB1919009.9 provides a way to predict the impact of these actions on the power consumption of a computing system.

JP2011160596A relates to a power supply system including an IT device represented by a server and a power supply device that supplies power to the IT device. The number of operating power supply units is controlled so that the power feed efficiency of the power supply device becomes maximum according to load currents flowing in a plurality of operating servers, and an uninterruptible power supply is arranged at the output side of each power supply unit. Furthermore, the number of operating power supply units is controlled by utilizing job information or measured power consumption. Even if prediction fails, the instantaneous interruption of power in a power feed bus is avoided by compensating a deficient current by power feed from the uninterruptible power supply installed at each output of the power supply unit to maintain stable operations of a server apparatus and the other device.

SUMMARY

This specification describes a computer-implemented method and a computer-implemented system for power capacity planning for a computing system, which may be employed in a datacenter.

According to an aspect of this specification, a computer-implemented method for power capacity planning for a computing system is provided, wherein the method comprises the following:

a) evaluating an activity of the computing system, wherein the activity comprises the number of program instances executed by the computing system and the load incurred by the executed program instances;

b) predicting an evolution of the activity based on the evaluated activity by using a first machine learning algorithm configured for activity evolution prediction;

c) predicting a power consumption of the computing system as a first power metric based on the predicted activity evolution and by using a second machine learning algorithm configured for power consumption prediction of the computing system;

d) predicting an autonomy of one or more uninterruptible power supplies of the computing system as a second power metric based on the predicted power consumption and by using a third machine learning algorithm configured for uninterruptible power supplies autonomy prediction and receiving as input the power consumption prediction of the computing system;

e) predicting a redundancy level of the computing system as a third power metric based on the predicted power consumption and a power architecture of the computing system;

f) generating output data related to power capacity planning by processing the first, second and third power metrics.

The program instances may comprise virtual machines and/or containers and the evaluating of an activity of the computing system may comprise at least one of the following: determining the number of virtual machines being executed by the computing system; determining the number of containers executed by the computing system; determining a pattern of evolution of the number of virtual machines and/or containers executed by the computing system; determining a pattern of evolution of the processing load and/or storage load for each virtual machine and/or container.

The predicting of an evolution of the activity may comprise predicting an evolution of the number of virtual machines and/or containers and/or the evolution of the processing load and/or storage load with the first machine learning algorithm from the determined number of virtual machines and/or containers, from the determined pattern of evolution of the number of virtual machines and/or containers, and/or from the determined pattern of evolution of the processing load and/or storage load for each virtual machine and/or container.

The second machine learning algorithm used for the predicting of a power consumption of the computing system may be based on the power consumption of physical servers of the computing system, which execute the program instances, and/or the third machine learning algorithm used for the predicting of an autonomy of one or more uninterruptible power supplies of the computing system may comprise an uninterruptible power supplies autonomy model.

The predicting of a redundancy level of the computing system may comprise receiving data about the power architecture from a power manager program configured to manage the power requirements of the computing system.

The generating of output data related to power capacity planning may comprise generating data for displaying the first, second and third power metrics on a user interface, particularly evolution in time of the first, second and third power metrics.

The method may further comprise generating data for displaying a warning related to the first, second and third power metrics on the user interface.

The method may yet further comprises receiving a user defined scenario related to the power capacity planning, performing the predicting acts c)-e) based on the received user defined scenario to obtain the first, second and third power metrics for the received user defined scenario, and generating output data related to power capacity planning by processing the first, second and third power metrics for the received user defined scenario.

A further aspect of this specification relates to a computer-implemented system for power capacity planning for a computing system, wherein the system is particularly configured for performing a method of any preceding claims, and wherein the system comprises an evaluation module configured for evaluating an activity of the computing system, wherein the activity comprises the number of program instances executed by the computing system and the load incurred by the executed program instances;

a first prediction module configured for predicting an evolution of the activity based on the evaluated activity by using a first machine learning algorithm configured for activity evolution prediction;

a second prediction module configured for predicting a power consumption of the computing system as a first power metric based on the predicted activity evolution and by using a second machine learning algorithm configured for power consumption prediction of the computing system and for predicting an autonomy of one or more uninterruptible power supplies of the computing system as a second power metric based on the predicted power consumption and by using a third machine learning algorithm configured for uninterruptible power supplies autonomy prediction and receiving as input the power consumption prediction of the computing system;

a third prediction module configured for predicting a redundancy level of the computing system as a third power metric based on the predicted power consumption and a power architecture of the computing system, and an output data generation module configured for generating output data related to power capacity planning by processing the first, second and third power metrics.

A yet further aspect of this specification relates to a non-transitory computer-readable storage device storing software comprising instructions executable by a processor of a computing device which, upon such execution, cause the computing device to perform the method disclosed in this specification.

The details of one or more embodiments are set forth in the accompanying drawings and the description below. Other features and advantages will be apparent from the description and drawings, and from the claims.

DETAILED DESCRIPTION

Figure 1A:
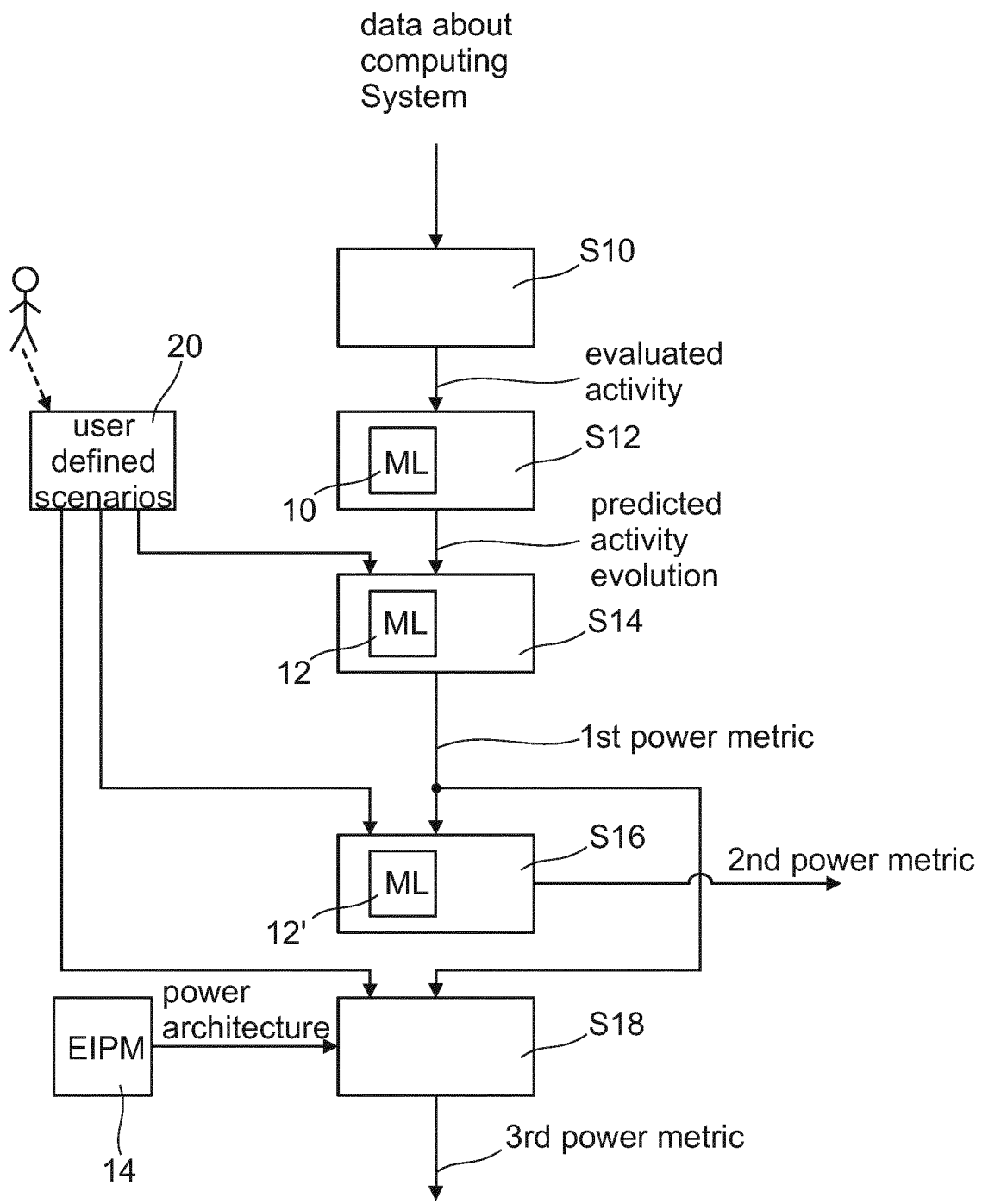
FIGS. 1A and 1B show an example of a method for power capacity planning for a computing system.

In the following, functionally similar or identical elements may have the same reference numerals. Absolute values are shown below by way of example only and should not be construed as limiting.

The term "virtual machine"—VM—used herein describes an emulation of a particular computer system. A VM is in the context of the present invention a special case of computer program with an operating system. The solution also applies to "light weight" VMs also called "containers". A VM and a container may be regarded as packaged computing environments, which combine different IT components and isolate them from the underlying system, particularly the computing system on which the VM or container is executed. The term "physical server"—PS—used herein describes an entity comprising a physical computer. A PS may comprise a hypervisor software, which configures the physical computer to host one or more virtual machines. The PS is in the context of the present invention a special case of computing device. The term "virtual system" used herein designates a system comprising two or more PSs, each hosting at least one VM. The term "computing system" as used herein generally describes a system comprising software and hardware as for example employed in a datacenter. The virtual system is in the context of the present invention a special case of computing system. A computing system may comprise one or more virtual systems.

The present specification relates to power capacity planning for a computing system, which may be employed in a datacenter, and the specification particularly relates to predicting power metrics and to compute an evolution of the predicted power metrics based on one or more user defined scenarios for power capacity planning of the computing system. Moreover, the methods and systems described herein may allow a datacenter manager to predict datacenter power metrics according to user defined scenarios, such as for example adding 10 servers and 100 VMs into an existing datacenter computing system. Thus, the methods and systems described herein may allow the datacenter manager to perform a power capacity planning in a datacenter.

The methods and systems described herein may use some of the features described in GB1919009.9, which is incorporated herein by reference and describes how to predict particularly VM level power consumption in a computing system such as a virtual system using machine learning. The machine learning algorithm described in GB1919009.9 may be applied in at least some of the methods and system described herein. Particularly, the methods and systems from GB1919009.9 may be extended to forecast power capacity metrics according to the present specification, which may then be used by the methods and systems as described herein.

Existing software tools provided for capacity planning in datacenters such as VMware vRealize Operation Manager 7 from VMware, Inc. are performing capacity planning in a datacenter based on compute and storage metrics only. The present specification proposes to extend the power capacity planning also to one or more power metrics such as the following:

Power consumption, which means the electrical energy per unit time and supplied to operate something such as components of a computing system, particularly PSs.

A UPS autonomy, which means a period of time a UPS may last in the event of a power failure. This value depends on the load level of a computing system supplied by a UPS.

A redundancy level (N, N+1, 2N, . . . ), which means the duplication of one or more critical components of a computing system in a datacenter to increase the system's reliability. This redundancy level may depend on a load level of a computing system.

The power metrics prediction may be particularly based on:

IT and power data acquisition (VM resource consumption, PS consumption, . . . ).

An artificial intelligence model for datacenter power consumption prediction.

The methods and systems described herein may solve customer problems particularly in the following ways:

Based on a "datacenter IT load trend", it may be estimated when three key metrics are under a predefined warning or critical threshold.

Based on a "datacenter IT load trend" and a "specific IT load increase", it may be estimated when the three key metrics are under a certain warning or critical threshold.

Figure 1B:
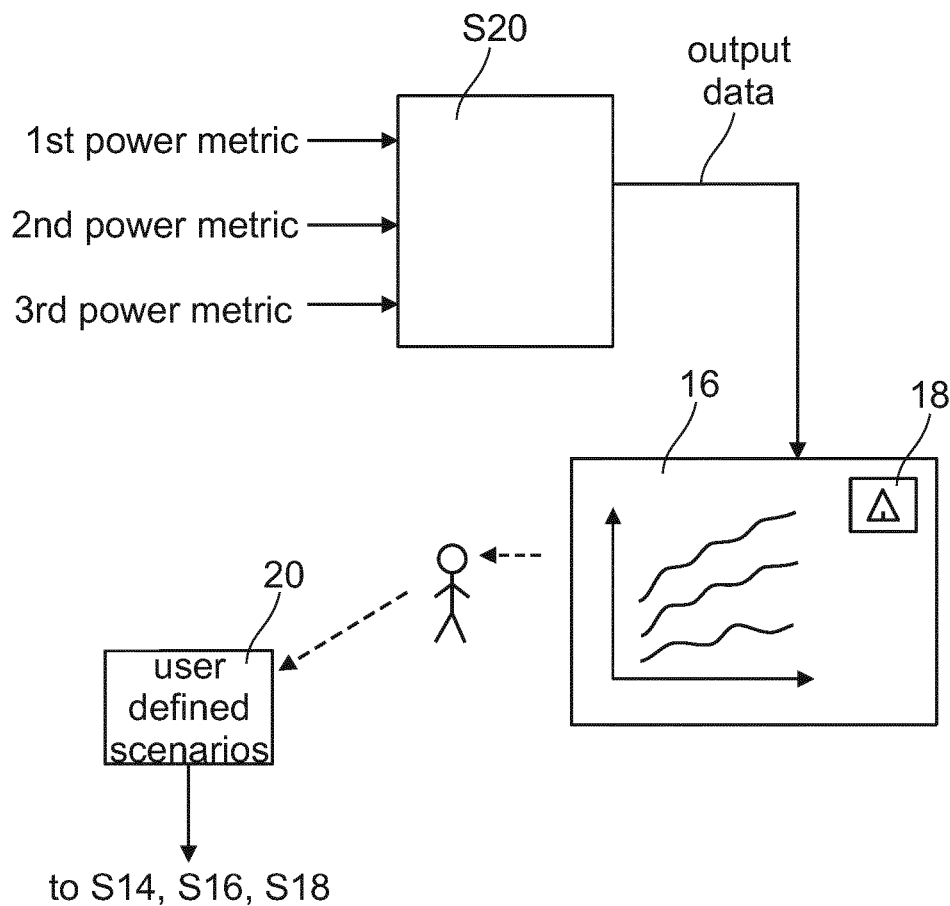

FIGS. 1A and 1B shows acts performed by a method for power capacity planning for a computing system:

The following items a) and b) are performed for obtaining data about an activity level in a computing system:

a) In S10, an activity of a computing system is evaluated. The computing system is represented by data provided for example with a program used for planning a computing system in a datacenter. The data about the computing system may particularly comprise information about the number of VMs and/or containers. The evaluated activity comprises the number of program instances executed by the computing system, particularly the VMs and containers executed on PSs, and the load incurred by the executed program instances. The evaluation particularly comprises determining the pattern of evolution of the number of VMs and/or containers, for example is the number constantly growing, is it flat, is it decreasing, is it periodic at day/night level, periodic at weekend level, periodic at a specific annual event (e.g. black Friday, Christmas, world soccer cup, . . . ). Furthermore, the evaluation particularly comprises determining for each VM and/or container the pattern of evolution of the processing load (CPU load) and/or storage load, for example is the respective load constantly growing, is it flat, is it decreasing, is it periodic at day/night level, periodic at weekend level, periodic at a specific annual event (e.g. black Friday, Christmas, world soccer cup, . . . ).

b) In S12, an evolution of the activity is predicted based on the evaluated activity. For the prediction, a dedicated machine learning algorithm 10 is applied, which is configured for activity evolution prediction. The machine learning algorithm 10 receives as input data the evaluated activity and outputs a prediction of the evolution of the activity, particularly the evolution of the VM and/or container number and/or the evolution of the processing and/or storage load (particularly at an individual level and a global level).

The following items c) to f) are performed for power metrics and capacity planning:

c) In S14, a power consumption of the computing system is predicted as a first power metric (predicted power consumption) based on the predicted activity evolution (item b)) and by using a further dedicated machine learning algorithm 12, which is configured for power consumption prediction of the computing system. The machine learning algorithm 12 may be for example the algorithm described in GB1919009.9.

d) In S16, an autonomy of one or more UPSs powering the computing system is predicted as a second power metric (predicted UPS autonomy) based on the predicted power consumption and by using a yet further dedicated machine learning algorithm 12', which is configured to receive as input the power consumption prediction of the computing system and for example the algorithm described in GB1919009.9. Particularly, the machine learning algorithm 12' may comprise an UPS autonomy model for predicting the autonomy of UPSs of the computing system.

e) In S18, a redundancy level of the computing system is predicted as a third power metric (predicted redundancy level) based on the predicted power consumption and a power architecture of the computing system. Data about the datacenter power architecture may be received for example from a program manager program 14 configured to manage the power requirements of the computing system, such as the Eaton Intelligent Power Manager (EIPM) software suite.

f) In S20, output data related to power capacity planning are generated by processing the first, second and third power metrics. The processing may particularly comprise the preparation of the metrics as output data for displaying them on a user interface (UI), particularly a graphical UI (GUI) 16. The first to third power metrics obtained as described above may be regarded as baseline prediction of the power metrics without an additional capacity planning scenario. The displaying of graphs representing these baseline predictions of the power metrics may already provide value to a user. Yet further, warnings 18 and/or alerts may be output, particularly if the power metrics change over a predefined time span, for example if a degradation can be foreseen over 6 months.

Figure 2:
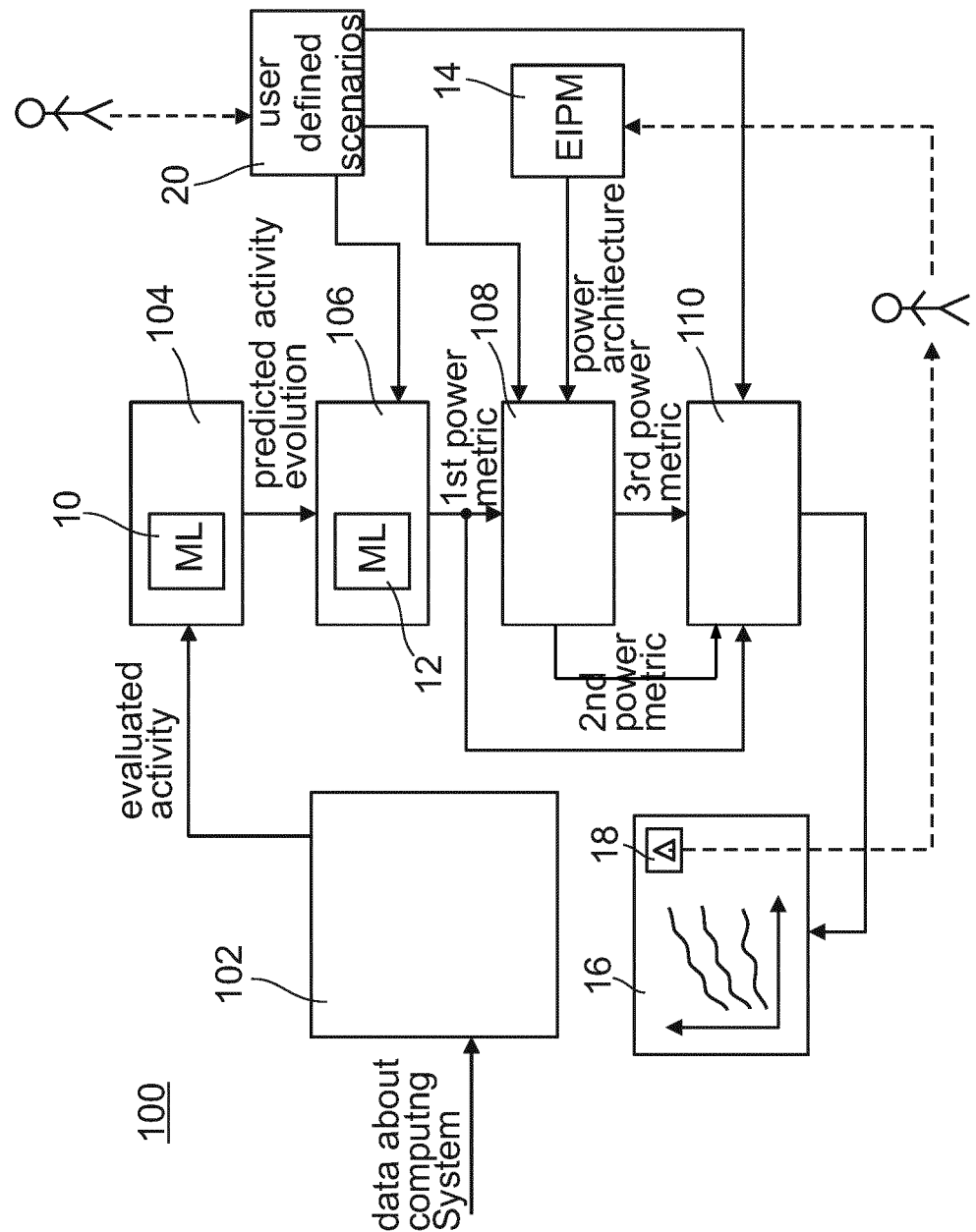
FIG. 2 shows an example of a system for power capacity planning for a computing system.

FIG. 2 shows a block diagram of a system for power capacity planning for a computing system. The system may be implemented by a computer program executed on a computer. The system comprises the following modules, which implement functions of the method as described above:

an evaluation module 102 implements S10;
a first prediction module 104 implements S12;
a second prediction module 106 implements S14 and S16;
a third prediction module 108 implements S18, and
an output data generation module 110 implements S20.

The modules may be for example implemented as part of a software suite provided for comprehensive power management in a datacenter and may extend for example the functionality of existing software suites such as the above mentioned EIPM software suite. The modules may be regarded as separate software modules, which implement the respective functionality as listed above and receiving input data and generating output data as shown in FIG. 2.

A further functionality can be provided by processing user defined scenarios. A user defined scenario may be provided for power capacity planning such as for example adding next month 100 VMs on existing PSs with a given resource usage or adding next month 30 new PSs hosting 200 VMs.

The evolution of the power metrics from a user defined scenario will be computed with S14, S16, S18 (see c) to e) above) by predicting the first to third power metrics taking the user defined scenario into account. The newly predicted power metrics can then be "added" to the baseline prediction of the power metrics without an additional capacity planning scenario, which is obtained in S20 (see f) above). It can be also output for displaying them on a UI so that a user can see the power metrics of the user defined scenario and compare them to the power metrics without a user defined scenario.

The user defined scenario can be for example input by a user via a GUI into a computer program or software suite implementing the method and/or system for power capacity planning.

User defined scenarios particularly allow a user to anticipate and then tune a power architecture to avoid any degradation of power capacity metrics. For example, a user can define different user defined scenarios, perform a power capacity planning with a method and/or system as described herein, and let the different power metrics for each scenario visualize on a GUI to compare them. This may enable the user to detect degradation of power capacity metrics for different user defined scenarios giving the user the possibility to improve power capacity planning for a computing system in a datacenter. Also, warnings 18 and/or alerts may be output to the user, which can be automatically generated when certain thresholds are passed by certain parameters, for example when a certain degradation degree is exceeded. The user may be enabled for example by the GUI to alter user defined scenarios in order to tune the power architecture regarding the power metrics.

FIG. 2 shows a further application of how the user can perform power capacity planning with the shown system: warnings on power metrics thresholds displayed in S20 of FIG. 1B or as warnings and/or alerts 18 can be interpreted by the user (arrow from 18 to the user in FIG. 2), for example in that the user can understand under which circumstances thresholds are passed. The user can then define a "new power architecture" with additional power capacity, particularly based on the warnings and/or alerts. For example, the user can interpret an alert or warning such that a further power demand due to an increased processing requirement may result in a yet further reduction of UPS autonomy, the user plan to increase the UPS autonomy by adding further redundancy to the power architecture. The "new power architecture" can be simulated with for example the above mentioned EIPM software suite (arrow from user to 14 in FIG. 2). The user will then be able to check if this "new power architecture" solves the power metrics warnings "18".

Figure 3:
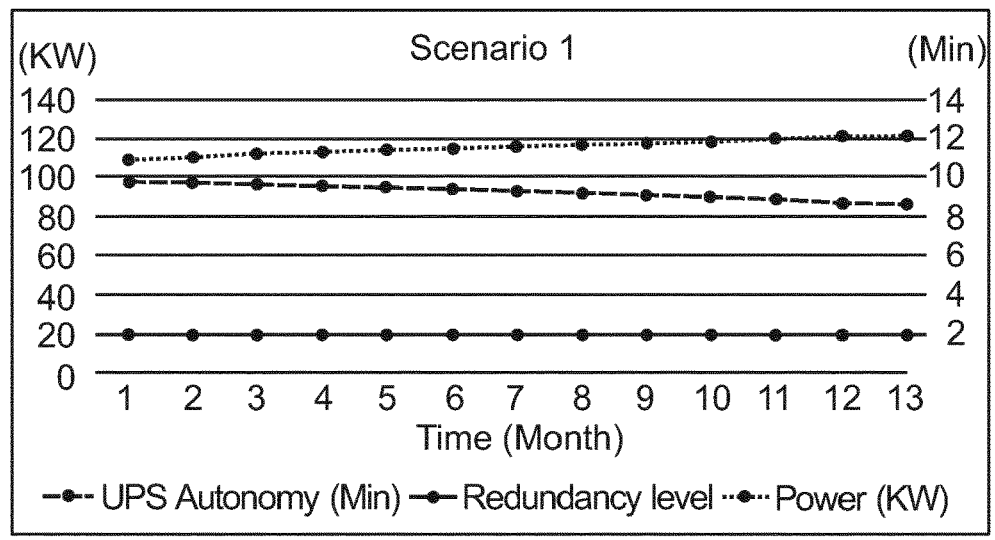
FIG. 3 shows examples of representations of output data generated for three different user defined scenarios with a method for power capacity planning for a computing system.
Figure 3:
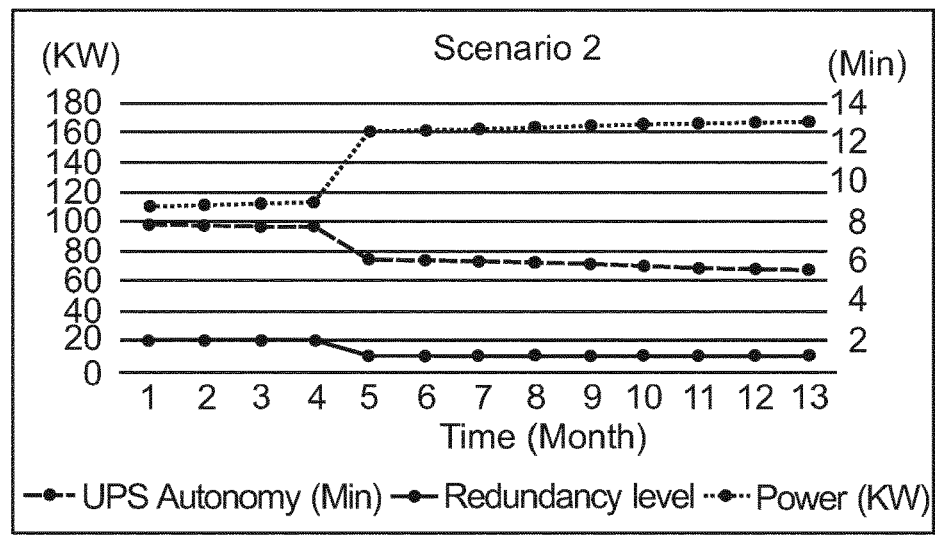
Figure 3:
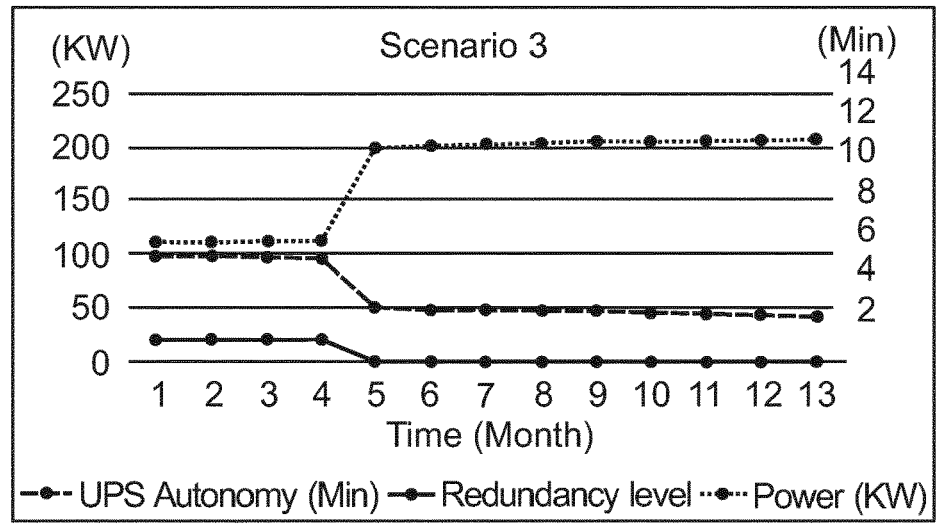

FIG. 3 shows examples of representation of three different user defined scenarios 1 to 3. Each representation shows three graphs over the time (in months): the bottom graph is the redundancy level, the middle graph the UPS autonomy in minutes (right vertical axis), and the top graph the power in kW (left vertical axis). Scenario 1 is a predicted evolution without adding a specific load. It should be noted that the trend can be flat as or can be cyclical (daily, weekly, yearly, . . . ). Scenario 2 is a predicted evolution when adding 30 VMs (activity xxx) on existing 100 PSs. The user may define as input parameter the VM compute characteristics. Scenario 3 is a predicted evolution when adding 30 VMs on new 20 PSs (model xxx). As input parameter, the user may define the following information: new PS power characteristics (the estimation may be more accurate if the new PSs are like the existing PSs), VM compute characteristics.

The methods and systems described herein enable an improved power capacity planning for a computing system, particularly of a virtual system, particularly employed in a datacenter, at relatively fine grain.

The invention claimed is:

1. A computer-implemented method for power capacity planning for a computing system comprising the following:
   a) evaluating an activity of the computing system, wherein the activity comprises the number of program instances executed by the computing system and the load incurred by the executed program instances;
   b) predicting an evolution of the activity based on the evaluated activity by using a first machine learning algorithm configured for activity evolution prediction;
   c) predicting a power consumption of the computing system as a first power metric based on the predicted activity evolution and by using a second machine learning algorithm configured for power consumption prediction of the computing system;
   d) predicting an autonomy of one or more uninterruptible power supplies of the computing system as a second power metric based on the predicted power consumption and by using a third machine learning algorithm configured for uninterruptible power supplies autonomy prediction and receiving as input the power consumption prediction of the computing system; and,
   e) predicting a redundancy level of the computing system as a third power metric based on the predicted power consumption and a power architecture of the computing system;
   f) generating output data related to power capacity planning by processing the first, second and third power metrics;
   g) generating a warning based on determining that at least one of the first power metric, the second power metric, or the third power metric exceeds a degradation threshold;
   h) receiving a user defined scenario related to the power capacity planning;
   i) performing the predicting acts c)-e) based on the received user defined scenario to obtain the first, second and third power metrics for the received user defined scenario;
   j) generating output data related to power capacity planning by processing the first, second and third power metrics for the received user defined scenario; and
   k) altering the received user defined scenario to tune the power architecture based on the output data related to power capacity planning.

2. The method of claim 1, wherein the program instances comprise virtual machines and/or containers and the evaluating of an activity of the computing system comprises at least one of the following:
   determining the number of virtual machines being executed by the computing system;
   determining the number of containers executed by the computing system;
   determining a pattern of evolution of the number of virtual machines and/or containers executed by the computing system; and,
   determining a pattern of evolution of the processing load and/or storage load for each virtual machine and/or container.

3. The method of claim 2, wherein the predicting of an evolution of the activity comprises predicting an evolution of the number of virtual machines and/or containers and/or the evolution of the processing load and/or storage load with the first machine learning algorithm from the determined number of virtual machines and/or containers, from the determined pattern of evolution of the number of virtual machines and/or containers, and/or from the determined pattern of evolution of the processing load and/or storage load for each virtual machine and/or container.

4. The method of claim 1, wherein the second machine learning algorithm used for the predicting of a power consumption of the computing system is based on the power consumption of physical servers of the computing system, which execute the program instances, and/or wherein the third machine learning algorithm used for the predicting of an autonomy of one or more uninterruptible power supplies of the computing system comprises an uninterruptible power supplies autonomy model.

5. The method of claim 1, wherein the predicting of a redundancy level of the computing system comprises receiving data about the power architecture from a power manager program configured to manage the power requirements of the computing system.

6. The method of claim 1, wherein the generating of output data related to power capacity planning comprises generating data for displaying the first, second and third power metrics on a user interface.

7. The method of claim 6, further comprising generating data for displaying a warning related to the first, second and third power metrics on the user interface.

8. A computer-implemented system for power capacity planning for a computing system, wherein the system is particularly configured for performing the method of claim 1, and wherein the system comprises:
a processor configured to:
evaluate an activity of the computing system, wherein the activity comprises the number of program instances executed by the computing system and the load incurred by the executed program instances;
predict an evolution of the activity based on the evaluated activity by using a first machine learning algorithm configured for activity evolution prediction;
predict a power consumption of the computing system as a first power metric based on the predicted activity evolution and by using a second machine learning algorithm configured for power consumption prediction of the computing system and for predicting an autonomy of one or more uninterruptible power supplies of the computing system as a second power metric based on the predicted power consumption and by using a third machine learning algorithm configured for configured for uninterruptible power supplies autonomy prediction and receiving as input the power consumption prediction of the computing system;
predict a redundancy level of the computing system as a third power metric based on the predicted power consumption and a power architecture of the computing system;
generate output data related to power capacity planning by processing the first, second and third power metrics;
generate a warning based on determining that at least one of the first power metric, the second power metric, or the third power metric exceed a degradation threshold;
receive a user defined scenario related to the power capacity planning;
perform the predicting acts based on the received user defined scenario to obtain the first, second and third power metrics for the received user defined scenario;
generate output data related to power capacity planning by processing the first, second and third power metrics for the received user defined scenario; and
alter the received user defined scenario to tune the power architecture based on the output data related to power capacity planning.

9. A non-transitory computer-readable storage device storing software comprising instructions executable by a processor of a computing device which, upon such execution, cause the computing device to perform the method of claim 1.

10. The method of claim 6, wherein generating data for displaying the first, second, and third power metrics on the user interface comprises displaying an evolution in time of the first, second and third power metrics.

11. The method of claim 1, further comprising generating a second warning based on determining that at least one of the first power metric, the second power metric, or the third power metric change over a predefined time span.

12. The method of claim 1, further comprising generating a second warning based on determining that a degradation of at least one of the first power metric, the second power metric, or the third power metric is foreseen over six months.

* * * * *